United States Patent [19]

Conley

[11] Patent Number: 4,726,411
[45] Date of Patent: Feb. 23, 1988

[54] SHEET GRIPPING ASSEMBLY FOR SINGLE AND DUAL SHEET MATERIAL

[76] Inventor: John L. Conley, 3870 Chino Ave., Chino, Calif. 91710

[21] Appl. No.: 868,874

[22] Filed: May 23, 1986

Related U.S. Application Data

[63] Continuation of Ser. No. 462,468, Jan. 31, 1983, abandoned.

[51] Int. Cl.$^4$ ............................................. A47H 13/00
[52] U.S. Cl. ...................................... 160/392; 160/395
[58] Field of Search .................... 160/392, 395; 24/462

[56] References Cited

U.S. PATENT DOCUMENTS

| | | | |
|---|---|---|---|
| 1,484,382 | 2/1924 | Allitt | 24/462 |
| 3,803,671 | 4/1974 | Stuppy et al. | 24/456 |
| 3,811,454 | 5/1974 | Huddle | 160/395 |
| 3,848,380 | 11/1974 | Assael | 160/395 X |
| 3,999,258 | 12/1976 | Curry | 24/462 |
| 4,103,401 | 8/1978 | Conley | 160/392 |
| 4,193,235 | 3/1980 | Cucchiara | 160/380 X |
| 4,231,141 | 11/1980 | Derrick | 160/395 X |
| 4,279,064 | 7/1981 | Simme | 160/392 |
| 4,316,308 | 2/1982 | Chatelain | 160/392 X |
| 4,467,504 | 8/1984 | Quist | 160/395 |

*Primary Examiner*—Ramon S. Britts
*Assistant Examiner*—David M. Purol
*Attorney, Agent, or Firm*—Boniard I. Brown

[57] ABSTRACT

A sheet gripping assembly for thin pliable sheet material, such as plastic film comprising either a single sheet or two separate sheets disposed face to face. The sheet gripping assembly has an elongate base with a longitudinal channel opening through one longitudinal side of the base for receiving the sheet material to be gripped and a sheet lock insert which coacts with the channel side walls to grip the sheet material between interengaging longitudinal edge formations on the sidewalls and insert. A second sheet lock insert is provided to secure one sheet of dual sheet material within a second channel in the base.

4 Claims, 10 Drawing Figures

U.S. Patent  Feb. 23, 1988  Sheet 1 of 2  4,726,411
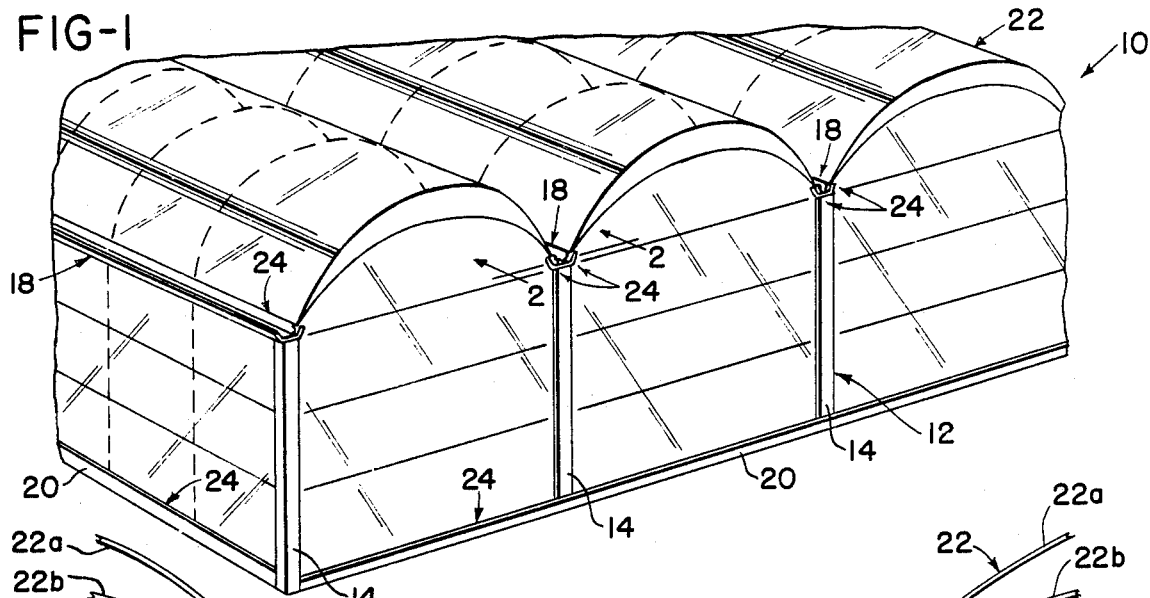
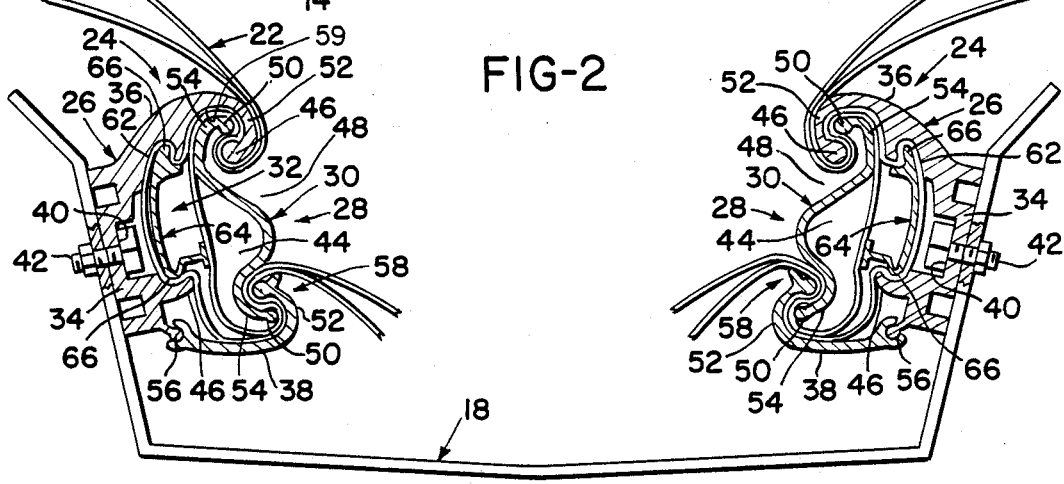
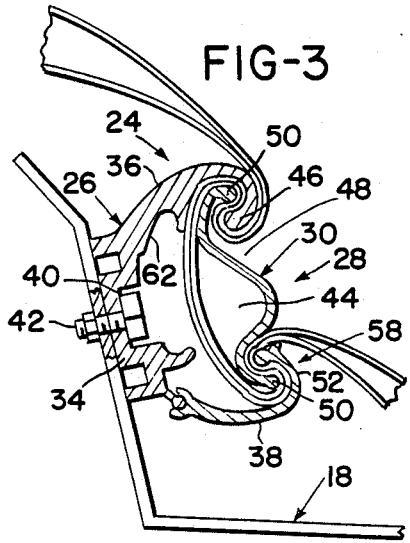
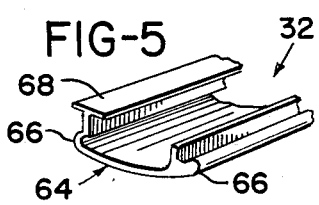
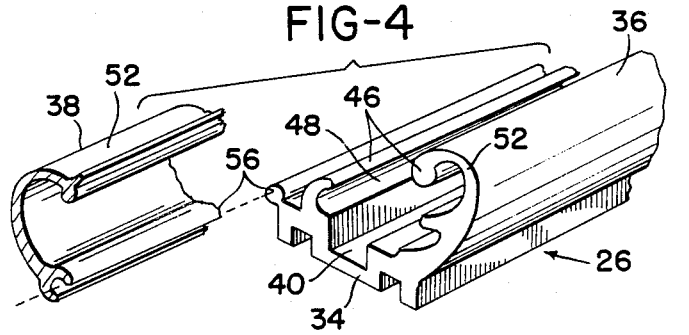

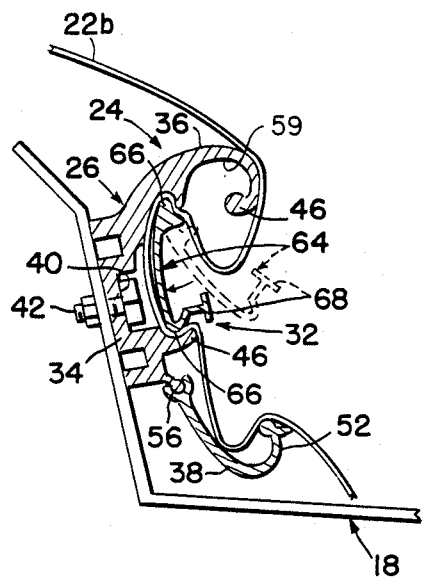
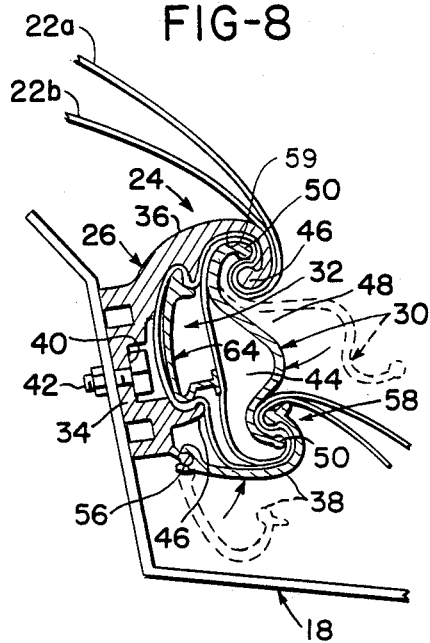
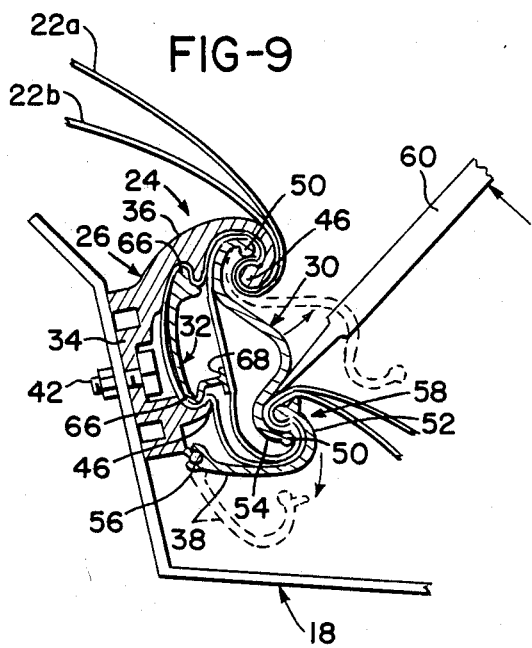
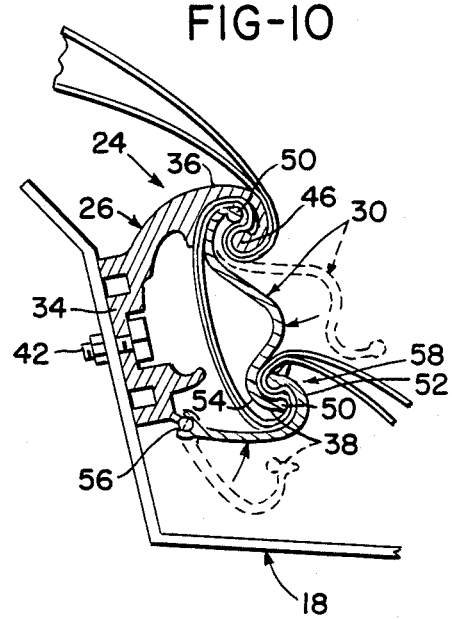

SHEET GRIPPING ASSEMBLY FOR SINGLE AND DUAL SHEET MATERIAL

This is a continuation of co-pending application Ser. No. 462,468 filed on Jan. 31, 1983 now abandoned.

RELATED APPLICATIONS

Reference is made to my prior U.S. Pat. No. 4,103,401, issued Aug. 1, 1978, entitled "Sheet Gripping Assembly."

BACKGROUND OF THE INVENTION

1. Field of the Invention.

This invention relates generally to the attachment of thin pliable sheet material, such as plastic film, to a support, such as an enclosure frame work. More particularly, the invention relates to an improved sheet gripping assembly for this purpose securing either single sheet or dual sheet material.

2. Prior Art.

As will appear from the later description, the improved sheet gripping assembly of the invention is capable of many diverse sheet gripping applications, involving a wide variety of sheet-like materials. However, the present gripping assembly is intended primarily for use in the construction of a greenhouse of the class which comprises plastic film or a sheet material covering and supported by an open frame structure. The invention will be described in connection with this particular application.

One existing method of greenhouse construction involves the erection of an open frame structure from pipes, tubes or the like, some of which are installed upright-with their lower ends anchored to the ground to form vertical supporting posts or columns and others of which span the upper ends of the posts to form an overhead framework. Over this frame structure are stretched plastic sheets or films to form a weather and wind resistent covering or skin which is transparent to the sun's ultra-violet radiation.

One essential element of such a greenhouse construction is a means for firmly but releasibly securing the plastic film to the frame structure, such that the film will remain firmly in place under relatively high winds and yet may be quickly and easily replaced when necessary. A variety of film attachment techniques have been devised for this purpose. One of the more widely used techniques involves the sheet gripping assembly described in U.S. Pat. No. 3,803,671. Simply stated, this patent sheet gripping assembly comprises a channel-like base which is firmly attached to the greenhouse frame structure and a removable sheet holding member or bar insertable laterally into the channel of the base through an open side of the channel. In use, the sheet holding the bar is removed and the plastic film is placed across the open side of the base and then pushed through the open side into the channel to form essentially a fold in the channel. The holding bar is inserted through the open side of the channel into this fold in such a way as to firmly grip the plastic film between the base and holding bar.

Such gripping assemblies of this general type suffer from two disadvantages which this invention overcomes. One disadvantage resides in the fact that tension force in the sheet material tends to, and in the case of the existing sheet gripping devices often does, dislodge the sheet holding or gripping bars from the hose channel through its open side. This tension force may result from wind loads on the sheet material or plastic film. thermal deformation in the sheet material, and so on.

Also, in some applications, the sheet material or plastic film has a double wall thickness with entrapped air between the two walls. Thermal expansion of this air creates tension stress in the sheet material tending to dislodge the sheet gripping bar. In addition, air often collects in a pocket between the base and the gripping bar in such a way that thermal expansion of this air pocket exerts an outward dislodging force on the gripping bar.

My earlier mentioned U.S. Pat. No. 4,103,401 discloses an improved sheet gripping assembly which avoids the above problems.

Another disadvantage of the existing sheet gripping assemblies is their inability to independently secure the two sheets of dual sheet material. This inability renders it difficult to remove one sheet when degraded beyond use while leaving in place the second sheet which may be capable of further use.

This invention provides a further improved and simplified sheet gripping assembly which avoids such problems.

SUMMARY OF THE INVENTION

According to one of its important aspects, this invention provides an improved sheet gripping assembly having a channel-like base member containing a longitudinal, laterally opening channel bounded along its sides by side walls on the base member. These side walls have longitudinal sheet gripping edges defining therebetween an intervening side opening of the channel and are relatively movable toward and away from one another. In the preferred form of the invention, for example, one wall is rigid and the other wall is hinged to pivot toward and away from the rigid wall. Positionable in sheet gripping position within the channel is a resilient sheet lock insert which, when in gripping position, spans the side opening of the channel. The insert has longitudinal sheet gripping edges and the channel sidewall edges have releasibly interengaging or interlocking formations for retaining the insert in position. These interengaging or interlocking formations include an inner longitudinal recess in one channel side wall which removably receives the adjacent longitudinal edge of the sheet lock insert and supports the insert cantilever fashion for deflection between an unstressed position wherein the insert projects outwardly through the channel side opening and a stressed position wherein the longitudinal edge of the other channel side wall overlaps and interlocks with the other edge of the insert to retain the latter in gripping position. The interlocking edge formations are engaged and disengaged, to install and remove the insert, by relative movement of the channel side walls toward and away from one another. In the preferred embodiment, for example, the sheet gripping edge on the hinged channel side wall snaps over the adjacent sheet gripping edge on the insert to retain the latter in gripping position when the hinged side wall is pivoted toward the rigid channel side wall. The insert is released for removal by pivoting the hinged wall away from the rigid wall to disengage the sheet gripping edge of the hinged wall from the insert.

In use of the gripping assembly, its base member is fixed to a support, such as a greenhouse enclosure frame work. Plastic film or other sheet material to be secured to the support is then tucked into the base member channel through its side opening, after which the sheet lock insert is installed in the channel. When thus assembled, the sheet material extends through the channel across the underside of the insert and is firmly gripped between the gripping edges on the insert and channel side walls.

Another aspect of the invention is concerned with independently securing or anchoring the two sheets of dual sheet or two ply sheet material in a manner such that one sheet may be released without releasing the other sheet. In the described greenhouse application, for example, this capability permits an outer, weather degraded sheet of two ply plastic film to be removed or replaced without releasing the inner plastic film which may still be serviceable. This is particularly advantageous in windy conditions.

According to this aspect, the channel base member is provided with two separate sheet lock means, one for releasably securing at least one sheet to the base member and the other for independently securing the other sheet to the base member. In the preferred embodiment, the first sheet lock means comprises the base member channel with its side walls and the sheet lock insert. The second sheet lock means comprises a second channel in the bottom of the base member channel for recovering the second sheet and a second sheet lock insert positionable in the second channel over the second sheet to secure the latter in the channel.

BRIEF DESCRIPTION OF THE DRAWINGS

FIG. 1 is a perspective view of a two ply plastic film covered greenhouse enclosure embodying sheet gripping assemblies according to the invention;

FIG. 2 is an enlarged section taken on lines 2—2 in FIG. 1;

FIG. 3 illustrates the assembly gripping tubular plastic film;

FIG. 4 is an exploded perspective view of the gripping assembly base member;

FIGS. 5 and 6 are enlarged fragmentary perspective views of the under and outer sheet lock inserts, respectively in the sheet gripping assembly illustrated in FIGS. 1 and 2;

FIGS. 7 and 8 illustrate successive steps in securing and releasing two ply sheet material to and from the sheet gripping assembly of FIGS. 1 and 2;

FIG. 9 illustrates the method of releasing the outer sheet or ply only from the sheet gripping assembly of FIGS. 1 and 2; and FIG. 10 illustrates the method of securing and releasing sheet material, such as so-called tubular plastic film, to and from the sheet gripping assembly.

DESCRIPTION OF THE PREFERRED EMBODIMENT

Referring first to FIG. 1 of the drawings, the illustrated greenhouse 10 comprises an open frame structure 12. This frame structure includes uprights 14 (only a few shown) joined and bridged at their upper ends by overhead channel-like beams 18. About the base perimeter of the frame structure are sill members 20. Covering the frame structure 12 is sheet material in the form of two ply plastic film 22 which is transparent to the sun's radiation. The plastic film is secured to the frame structure by sheet gripping assemblies 24 according to the invention which extend along the beams 18 and the sill members 20. Except for these gripping assemblies, the greenhouse construction is conventional. Accordingly, no further description of the greenhouse per se is required.

Turning now to FIGS. 2, 5, 6 and 7-9, the sheet gripping assembly 24 of the invention comprises an elongate channel-like base member 26 and sheet lock means 28 for releasably securing the sheet material 22 to base member. In the particular inventive embodiment illustrated, which may be used with dual sheet or two ply sheet material including two plies or sheets 22a and 22b disposed face to face, the sheet lock means 28 comprises first sheet lock means 30 which secures both plies or sheets 22a, 22b and second sheet lock means 32 which secures only the ply or sheet 22b, which is situated nearest the base member.

In the particular greenhouse application illustrated, the sheet 22a is located outermost in direct exposure to the elements and is referred to as the outer sheet or ply. The second sheet 22b is covered by the outer sheet and is referred to as the inner sheet or ply. Briefly, in use of the gripping assembly, the base member 26 is fixed to a support, in this instance the greenhouse frame structure 12. Sheet material to be attached or anchored to the support, in this instance the plastic film 22, is tucked into the base member, after which the sheet lock means 30 and 32 are positioned in the base member, as shown in FIGS. 2 and 8, to firmly secure the film to the base member.

Referring in more detail to the drawings, the channel-like base member 28 includes an elongate mounting base 34 and upstanding longitudinal side walls 36, 38 along the longitudinal edges of the base. The base member contains a longitudinal laterally opening channel 44 bounded by the base 34 and side walls 36, 38. Entering the inner side of the base wall 34 along its longitudinal center line is a recess 40. Holes extend through the bottom of this center recess to receive bolts 42 for attaching the base member 26 to its support.

The base member side walls 36, 38 arch inwardly toward one another and are generally cylindrically curved in the particular embodiment illustrated. The side walls have longitudinal rounded bead-like sheet gripping edges 46 which are spaced to provide therebetween a longitudinal side opening 48 to the base member channel 44. Base member 26 may be extruded or otherwise fabricated from suitable material, as discussed later.

The first or outer sheet lock means 30 comprises an elongate sheet lock insert which, like the channel base member 26, may be extruded. This insert has a lateral dimension exceeding the width of the side opening 48 of the base member channel 44 in the operative sheet gripping configuration of the gripping assembly shown in FIG. 2. Along the longitudinal sides of the insert are rounded bead-like sheet gripping edges 50.

The sheet lock insert 30 has a sheet gripping position within the base member channel 44, shown in FIGS. 2, 8 and 9, wherein the insert laterally spans the channel side opening 48 and the longitudinal (sheet gripping) edge portions of the channel side walls 36, 38 project inwardly toward one another over the longitudinal (sheet gripping) edge portions of insert. These longitudinal edge portions of the channel side walls and sheet lock insert are curled, as shown, to provide releasably interengagable interlocking formations 52, 54 on the walls and insert which retain the insert in its sheet gripping position.

The sheet lock insert 30 and channel side walls 36, 38 are relatively movable toward and away from one another to engage and disengage the interengagable or interlocking formations 52, 54 to permit attachment of the sheet material 22 to and release of the sheet material from the sheet gripping assembly 24. When attached to the gripping assembly, the sheet material extends through the base member channel 44, across the underside of the sheet lock insert 30 which then occupies its sheet gripping position, and from the channel between the adjacent interengaging longitudinal edge formations 52, 54 and sheet gripping edges 46, 50 of the channel side 36, 38 and the insert.

In the presently preferred inventive embodiment illustrated, the channel side wall 36 is a rigid wall intergral with the base member mounting base 34. The channel side wall 38 is movable toward and away from the rigid wall. To this end, the movable wall 38 is joined to the mounting base 34 by a groove and bead hinge connection 56 for pivotal movement of the wall toward and away from the rigid wall. The curled interengaging or interlocking formations 52, 54 on the sheet lock insert 30 and hinged channel side wall 38 form interlocking means 58 which are engagable and disengagably by pivotal movement of the wall 38 toward and away from the rigid channel side wall 36. When these interlocking means are engaged, the curled edge portion 52 of the hinged channel side wall 38 curves over the adjacent sheet gripping edge 50 of the insert 30, which is yieldably biased to retain the interlocking means engaged, as described below.

The curled interengaging or interlocking formations 52, 54 on the sheet lock insert 30 and rigid channel wall 36 include an inner arcuate longutudinal recess 59 in the rigid wall which receives the adjacent longitudinal edge of the insert to support the insert cantilever fashion in a manner such that the insert, when disengaged from the hinged channel wall 38, assumes a normal unstressed position shown in phantom lines in FIGS. 8 and 9. In this unstressed position, the insert projects obliquely outward through the channel side opening 48, as shown. Accordingly, engagement of the interlocking means 58 on the insert and hinged wall required deflection of the insert from its unstressed position, thereby resiliently stressing the insert to yieldably retain the interlocking means 58 engaged.

When the interlocking means 58 are disengaged, the interengaging formations 52, 54 on the rigid channel wall 36 and the insert 30 are disengaged, to remove the insert from the base member 34, by rotating the insert slightly beyond its broken line position in FIGS. 8 and 9 withdraw the insert edge from the channel wall recess 59. Disengagement of the interlocking means 58 may be accomplished by prying apart the curled edges 52, 54 of the interlocking means with a suitable tool 60, as shown in FIG. 9.

As noted earlier, the sheet gripping assembly 24 has a second sheet lock means 32 for securing the inner sheet 22b of the two ply sheet material 22. This second sheet lock means comprises a second longitudinal channel 62 in the bottom wall or base 34 of the channel 44 and a second sheet lock insert 64 engagable with a snap fit in the channel 44. To this end, the longitudinal sides of the channel 44 are undercut, as shown, and the sheet lock insert 64 has longitudinal edges 66 which engage in the undercut channel sides. The insert 64 is sufficiently flexible to enable it to be snapped into and out of the channel 44, as shown in broken and solid lines in FIG. 7 and has a finger grip 68 to facilitate insertion and removal of the insert.

The two ply sheet material 22 is secured to the sheet gripping assembly 24 in the following steps. First, the two sheet lock inserts 30, 64 are removed from the base member 26 and the inner ply or sheet 22b of the sheet material 22 is tucked into the inner channel 62 through the open side 48 of the outer channel 36. The inner sheet lock insert 64 is then snapped into the inner channel over the inner sheet, as depicted in FIG. 7. The outer ply or sheet 22a is then tucked into the outer channel 44 through its open side 48, after which the outer sheet lock insert 30 is engaged with the rigid channel side wall 36 and the hinged channel side wall 38 is then snapped over the latter insert, as depicted in FIG. 8.

When thus assembled, both sheets 22a, 22b of the sheet material 22 are firmly gripped between the sheet gripping edge portions 52, 54 of the outer channel side walls 36, 38 and the outer sheet lock insert 30. The outer sheet 22a extends across the underside of the outer insert 30. The inner sheet 22b extends through the inner channel 62 and is secured, independently of the outer sheet 22a and outer sheet lock means 30, by the inner sheet lock means 32. As a consequence, the outer sheet lock means 30 may be released from the gripping assembly 24 without releasing the inner sheet.

The outer sheet may thus be removed or removed and replaced while the inner sheet remains firmly attached to the gripping assembly. This capability is a distinct advantage in the described greenhouse application since the outer plastic sheet or film which is directly exposed to the elements and thus tends to degrade more rapidly than the inner film, may be removed or replaced without encountering the difficulties which are normally encountered, particularly under windy conditions, in removing or replacing an outer plastic film when the inner film is not secured to the greenhouse frame.

As noted earlier, the sheet gripping assembly may be fabricated in various ways from various materials but is particularly adapted to the extrusion process. This it will be seen that each separate part of the assembly is capable of fabrication by an extrusion process from aluminum or other suitable material.

As shown in FIGS. 3 and 10, the present sheet gripping assembly may be used to secure single ply or sheet material or tubular sheet material (i.e. two ply material whose layers are joined along their edges). In this case, the inner sheet lock means 32 are not used or eliminated and the sheet material is secured solely by the outer sheet lock means 30 in the manner explained earlier.

The inventor claims:

1. A sheet gripping assembly for this pliable sheet material such as plastic film, comprising:
an elongate channel-like base member to be attached to a support and including a longitudinal, laterally opening channel bounded along its longitudinal sides by side walls having sheet gripping edges defining therebetween an intervening side opening to the channel, said side walls being relatively laterally movable to effect relative movement of said edges toward and away from one another,
an elongate relatively thin-walled resilient sheet lock insert having longitudinal sheet gripping edges,
said channel wall edges and said insert edges having releasibly interengagable formations, and said insert being positionable in sheet gripping position within said channel wherein said insert laterally spans said channel side opening and said channel wall and insert edge formations are disposed in interengaging relation to retain said insert in said position, said edge formations including an inner longitudinal rcess in one channel side wall removably receiving the adjacent longitudinal edge of said insert to support the insert cantilever fashion along the latter edge for rotation and resilient bending deflection of the insert between an unstressed position wherein the insert projects laterally and obliquely outward through the channel side opening and said sheet gripping position within the channel wherein the insert is resiliently stressed in a bending mode laterally across the insert to its opposite longitudinal edge and in a manner such that the insert is resiliently biased toward said unstressed position so as to retain said edge formations in interengaging relation, said channel walls being relatively laterally movable to narrow and enlarge said channel said opening and thereby facilitate insertion and removal of the insert into and from said channel as well as engagement and disengagement of said interengagable edge formations, whereby said insert may be placed in and released from said sheet gripping position with sheet material extending through said channel across the underside of said insert and from said channel between the adjacent wall and insert sheet gripping edges to secure the sheet material to and release the sheet material from said base member, said assembly being adapted to receive two ply sheet material including an inner sheet adjacent said base member and an outer sheet adjacent said sheet lock insert, and said assembly further including additional sheet gripping means independent of said insert for releasibly securing said inner sheet to said base, said additional gripping means being located within and accessible through said open side of said channel.

2. The sheet gripping assembly of claim 1 wherein:
said channel has a bottom wall, and
said additional sheet gripping means includes a second longitudinal channel in said bottom wall for receiving said inner sheet, and a second sheet lock insert insertable into said second channel over said inner sheet in a manner to releasibly secure said inner sheet within said second channel.

3. The sheet gripping assembly of claim 2 wherein:
said second sheet lock insert has a releasible interlocking fit within said second channel.

4. A sheet gripping assembly for pliable two ply sheet material such as plastic film including two sheets disposed face to face, comprising:
an elongate channel-like base member including a base portion to be attached to a support and side walls defining with said base portion a channel having a longitudinal side opening opposite said base portion for receiving both of said sheets through said open side with one sheet adjacent said base portion, first sheet lock means for releasibly securing said sheets to said base member including a first lock insert adapted to be inserted into and releasibly fixed in said channel over both of said sheets for securing both sheets in the channel, and second sheet lock means for releasibly securing said one sheet to said base member independently of said first sheet lock means including a second longitudinal channel in said base portion opening to and accessible through the open side of said first channel for receiving said one sheet, and a second sheet lock insert adapted to be inserted into and releasably fixed in said second channel over said one sheet for securing the latter sheet in the second channel prior to insertion of the other sheet and said first insert into said first channel.

* * * * *